United States Patent [19]

Reczek

[11] Patent Number: 5,648,015
[45] Date of Patent: Jul. 15, 1997

[54] PROCESS FOR PREPARING A FERROMAGNETIC MATERIAL

[75] Inventor: Steven T. Reczek, Penfield, N.Y.

[73] Assignee: Ferronics Incorporated, Fairport, N.Y.

[21] Appl. No.: 378,473

[22] Filed: Jan. 26, 1995

[51] Int. Cl.$^6$ .................................................. C04B 35/26
[52] U.S. Cl. ..................... 216/22; 252/62.56; 252/62.62; 264/613
[58] Field of Search ............................... 252/62.62, 62.56; 264/65, 66, 63

[56] References Cited

U.S. PATENT DOCUMENTS

| 3,860,524 | 1/1975 | Goldman | 252/62.62 |
| 4,247,500 | 1/1981 | Dixon et al. | 252/62.62 |

OTHER PUBLICATIONS

*Ferromagnetic Materials*, vol. 2, ed. Wohlfarth, 1980, p. 208 no month.

*Primary Examiner*—Melissa Bonner
*Attorney, Agent, or Firm*—Cumpston & Shaw

[57] ABSTRACT

A process for preparing a ferrite in which a green body containing at least about 50 weight percent of iron compound is first sintered and then cooled. During the cooling cycle, from about 1,000 to about 700 degrees centigrade, the body is contacted with a reduced oxygen atmosphere containing less than 10 volume percent of oxygen. From 700 to 200 degrees centigrade, the reduced oxygen atmosphere contains less than 1 part per thousand of oxygen. Thereafter, the sintered body is treated to remove at least some sharp edges and to change its permeability; and it is then contacted with an etchant.

13 Claims, 5 Drawing Sheets

PROCESS FOR PREPARING A FERROMAGNETIC MATERIAL

FIELD OF THE INVENTION

A process for preparing a sintered ferromagnetic body.

BACKGROUND OF THE INVENTION

Processes for making shaped and sintered ferrite bodies with good physical, mechanical, magnetic, and electrical properties are known. However, with most of these prior art processes, reproducibility is poor; and the properties of the ferrite bodies produced vary substantially from lot to lot (and within each lot) even when substantially identical processing parameters are used.

It is an object of this invention to provide a process for making shaped and sintered ferrite bodies with good physical, mechanical, magnetic, and electrical properties which will produce a substantially repeatable resulting product for a given set of conditions.

It is another object of this invention to produce a process for making shaped and sintered ferrite bodies which has a substantially higher yield, yield rate, and throughput than prior art processes and which substantially reduces the need to rework articles.

It is yet another object of this invention to provide a process of making shaped and sintered ferrite bodies in which the final geometric and magnetic configurations of the sintered ferrite bodies may be modified by tumbling the bodies.

It is yet another object of this invention to provide a process for making shaped and sintered ferrite bodies in which the surfaces of such bodies may be altered by means other than tumbling.

It is yet another object of this invention to provide a process for effecting the aforementioned goals with magnetostrictive materials other than ferrites.

SUMMARY OF THE INVENTION

In accordance with this invention, there is provided a process in which a specified ferrite green body is sintered and cooled while being subjected to a reduced oxygen environment, and then surfaces of the sintered body are then modified until the magnetic permeability of the body has changed by at least about five percent.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

The process of this invention is suitable for producing improved ferrite bodies.

As is known to those skilled in the art, a ferrite is a ferromagnetic compound containing iron in an oxygen lattice. See, for example, U.S. Pat. No. 3,576,672 of Harris et al., the entire disclosure of which is hereby incorporated by reference into this specification.

As used in this specification, the term ferromagnetic refers to a permanent magnet composed of mixtures of ceramic and magnetic powder which have been pressed together and sintered. The term ferromagnetic material refers to any material displaying ferromagnetism; that is, having an abnormally high magnetic permeability, a definite saturation point, and appreciable hysteresis. See, for example, the aforementioned Van Aulock book.

In one embodiment, the ferrite is a garnet. Iron garnet has the formula $M_3Fe_5O_{12}$; see, e.g., pages 65–256 of Wilhelm H. Von Aulock's "Handbook of Microwave Ferrite Materials" (Academic Press, New York, 1965). Garnet ferrites are also described, e.g., in U.S. Pat. No. 4,721,547, the disclosure of which is hereby incorporated by reference into this specification.

In another embodiment, the ferrite is a spinel ferrite. Spinel ferrites usually have the formula $MFe_2O_4$, wherein M is a divalent metal ion and Fe is a trivalent iron ion. M is typically selected from the group consisting of nickel, zinc, magnesium, manganese, and like. These spinel ferrites are well known and are described, for example, in U.S. Pat. Nos. 5,001,014, 5,000,909, 4,966,625, 4,960,582, 4,957,812, 4,880,599, 4,862,117, 4,855,205, 4,680,130, 4,490,268, 3,822,210, 3,635,898, 3,542,685, 3,421,933, and the like. The disclosure of each of these patents is hereby incorporated by reference into this specification. Reference may also be had to pages 269–406 of the Aulock book for a discussion of spinel ferrites.

In yet another embodiment, the ferrite is a lithium ferrite. Lithium ferrites are often described by the formula $(Li_{0.5}Fe_{0.5})^{2+}(Fe_2)^{3+}O_4$. Some illustrative lithium ferrites are described on pages 407–434 of the aforementioned Van Aulock book and in U.S. Pat. Nos. 4,277,356, 4,238,342, 4,177,438, 4,155,963, 4,093,781, 4,067,922, 3,998,757, 3,767,581, 3,640,867, and the like. The disclosure of each of these patents is hereby incorporated by reference into this specification.

In yet another embodiment, the preferred ferrite is a hexagonal ferrite. These ferrites are well known and are disclosed on pages 451–518 of the Van Aulock book and also in U.S. Pat. Nos. 4,816,292, 4,189,521, 5,061,586, 5,055,322, 5,051,201, 5,047,290, 5,036,629, 5,034,243, 5,032,931, and the like. The disclosure of each of these patents is hereby incorporated by reference into this specification.

Figure 1:
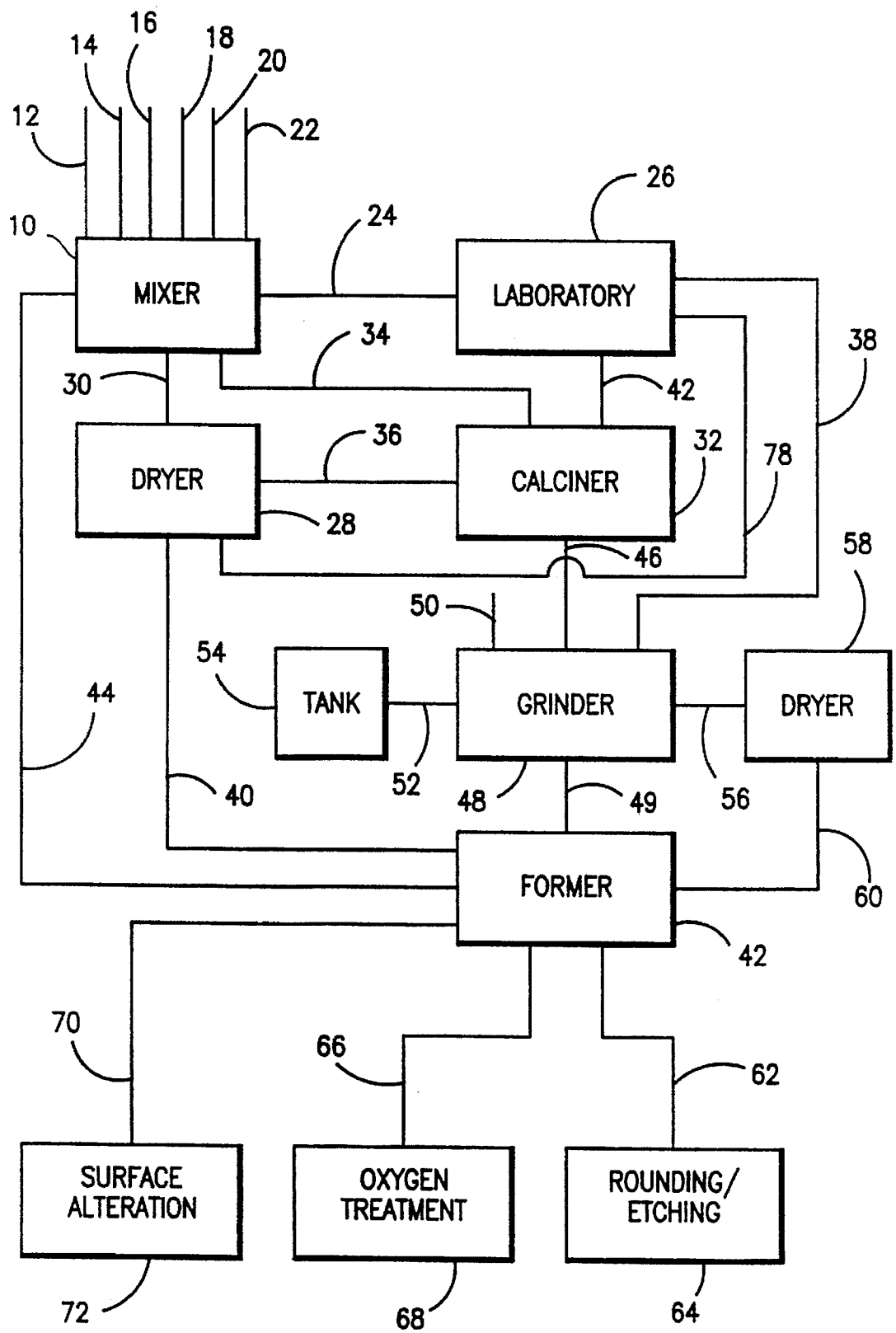
FIG. 1 is a flow diagram of one preferred embodiment of the invention.

FIG. 1 is a flow diagram of one preferred process of the instant invention. Referring to FIG. 1, it will be seen that, in the first step of the process, to mixer 10 are charged the ingredients necessary to form the ferromagnetic body. The process will be described with reference to the formation of preferred ferrite materials, it being understood that a comparable process may be used to form other ferromagnetic materials (such as, e.g., alloys, metals, and the like).

Referring to FIG. 1, an iron source is preferably charged via line 12. This iron source is preferably an iron oxide, such as ferrous oxide, ferric oxide, ferrous ferric oxide, mixtures thereof, and the like. Alternatively, or additionally, the iron source may be elemental iron, or an iron compound which is converted to iron oxide upon sintering. Thus, in addition to or instead of iron oxide, one may use iron carbonate, iron carbonyl, iron chloride, ferric hydroxide, ferric nitrate, ferric citrate, and the like. It will be apparent to those skilled in the art that, when an iron compound other iron oxide is used, a sufficient amount of material will be charged to the mixer 10 so that it will be converted to the desired concentration of iron oxide.

In one preferred embodiment, the iron source is ferric oxide which, as those skilled in the art are aware, is $Fe_2O_3$. This ferric oxide is often identified as "CAS: 1309-37-1"; it is a dense, material with a density of from about 5.12 to about 5.24 grams per cubic centimeter.

It is most preferred to use an alpha-ferric oxide such as, e.g., the alpha ferric oxide described in U.S. Pat. No. 4,414,196. The entire disclosure of this patent is hereby incorporated by reference into this specification.

As is known to those skilled in the art, alpha ferric oxide is commercially available and may be obtained, e.g., from the Chemrite Ltd. company of Kyoto, Japan as product number CSS-410E.

It is preferred that the iron source charged via line 12 have a particle size distribution so that substantially all of its particles are smaller than 1,000 microns and, more preferably, smaller than 10 microns. In an even more preferred embodiment, it is preferred that substantially all of the particles of the iron source be smaller than about 2 microns.

It is preferred to charge a sufficient amount of the iron source to mixer 10 so that the mixture formed in mixer 10 is comprised of at least about 50 weight percent (by dry weight of all materials) of the iron source (as iron oxide). In a more preferred embodiment, a sufficient amount of the iron source is charged so that at least about 65 weight percent of the mixture in mixer 10 comprises the iron source.

As is known to those skilled in the art, the ferrite material may consist essentially of magnetite ($Fe_3O_4$), in which case no other metal or metal oxide material is charged to mixer 10 in an amount exceeding about 1 weight percent. However, as is known to those skilled in the art, the iron or iron oxide(s) material may be substituted, in whole or part, by one or more other metal or metal compound materials.

Thus, in one preferred embodiment, from about 0.1 to about 50 percent of a source of zinc (as zinc oxide, by total weight of dry material in mixer 10) is charged via line 14. In this embodiment, it is preferred to charge from about 10 to about 20 weight percent (by dry weight) of a source of zinc.

The source of zinc may be elemental zinc. It is preferred, however, that the source of zinc be a zinc compound such as zinc oxide, or a zinc compound which is converted to zinc oxide upon sintering. Thus, in addition to or instead of zinc oxide, one may use zinc carbonate, zinc chloride, zinc nitrate, zinc chlorate, zinc hydroxide, and the like. It will be apparent to those skilled in the art that, when the zinc source is either elemental zinc or a zinc compound other than zinc oxide, a sufficient amount of such material(s) is used so that, after sintering, it is converted into the desired concentration of zinc oxide.

The preferred zinc compound is zinc oxide, and it is preferred to use zinc oxide with a particle size such that substantially all of its particles are smaller than about 10 microns and, more preferably, are smaller than about 5 microns.

Zinc oxide is readily commercially available and may be obtained, e.g., from the Zochem Incorporated of Brampton, Ontario as product ZOCO-104.

Two commonly used ferrites are comprised of nickel, Zinc, and iron, and manganese, zinc, and iron. Thus, in addition to the zinc, one may also charge a source of nickel oxide to mixer 10 via line 16.

When a source of nickel oxide is added to mixer 10, it is preferred to charge from about 0.1 to about 50 weight percent (as nickel oxide, by dry weight of materials in mixer 10). However, it is preferred to use from about 10 to about 20 weight percent of the nickel (as nickel oxide). As before, one may use nickel oxide or a material which will be converted to nickel oxide such as, e.g., nickel, nickel carbonate, nickel carbonyl, nickel sesquioxide, nickel nitrate, nickel hydroxide, nickel chloride, and the like.

It is preferred to use nickel oxide, and it is preferred that the source of nickel oxide have a particle size distribution such that substantially all of its particles are smaller than about 10 microns.

Alternatively, or additionally, a source of manganese oxide may be charged via line 18 to mixer 10. In general, a sufficient amount of manganese oxide (or a source of such oxide, such as elemental manganese, or a non-oxide manganese compound) is charged so that the manganese oxide concentration is from about 0.1 to about 50 weight percent and, preferably, from about 10 to about 20 percent of manganese oxide.

It will be apparent to those skilled in the art that, subject to the limitation that at least 50 weight percent of the ferrite should be iron oxide, the zinc and/or the nickel and/or the manganese may be present in trace amounts (less than about 1.0 weight percent), in minor amount amounts (from about 5 to about 30 weight percent), or in major amounts (from about 40 to about 50 weight percent). Additionally, other oxide materials (or sources of oxide materials) may also be charged to mixer 10. Thus, one may charge via line 20 oxides (or precursors of oxides) one or more of the oxides (or compounds) of lithium, fluorine, chlorine, and the like sodium, magnesium, aluminum, silicon.

By way of illustration and not limitation, one may charge to mixer 10 ingredients sufficient to form one or more of the ferrites disclosed in U.S. Pat. No. 5,359,479 (polycrystalline ferrite), U.S. Pat. No. 5,358,660 (hexagonal ferrite), U.S. Pat. No. 5,354,610 (barium ferrite), U.S. Pat. No. 5,354,521 (strontium ferrite), U.S. Pat. No. 5,350,559 (ferrite steel), U.S. Pat. No. 5,334,955 (soft ferrite), U.S. Pat. No. 5,332,645 (barium ferrite), U.S. Pat. No. 5,330,594 (ferrite--pearlite structure), U.S. Pat. No. 5,323,282 (polycrystalline manganese--zinc ferrite), U.S. Pat. No. 5,323,160 (nickel-zinc ferrite), U.S. Pat. No. 5,310,431 (cobalt-nickel-molybdenum-titanium ferrite), U.S. Pat. No. 5,304,318 (lithium--titanium--tin--germanium ferrite), U.S. Pat. No. 5,290,652 (zinc oxide ferrite), U.S. Pat. No. 5,271,907 ($ZnFe_2O_4$ ferrite), U.S. Pat. No. 5,268,249 (ferrite containing divalent transition metal), U.S. Pat. No. 5,254,836 (silicon--manganese--chromium--niobium--copper ferrite), U.S. Pat. No. 5,243,911 (calcium oxide ferrite), U.S. Pat. No. 5,238,508 (chromium--nickel stainless steel composition), U.S. Pat. No. 5,223,049 (silicon--carbon--manganese--boron--titanium--aluminum ferrite), U.S. Pat. No. 5,217,545 (composition with ferrite number of from 1 to 15), U.S. Pat. No. 5,217,544 (martensite ferrite two-phased structure), U.S. Pat. No. 5,206,620 (ferrite and borosilicate glass), U.S. Pat. No. 5,201,583 (ferrite with iron, chromium, nickel, and one or more of carbon, silicon, manganese, phosphorous, sulfur, molybdenum, and copper), U.S. Pat. No. 5,198,138 (iron oxide, nickel oxide, manganese oxide, nickel-manganese oxide, zinc oxide), U.S. Pat. No. 5,190,842 (lead ferrite), U.S. Pat. No. 5,183,709 (cobalt ferrite), and the like. The disclosure of each of these United States patents is hereby incorporated by reference into this specification.

As will be apparent to those skilled in the art, the materials charged to mixer 10 will depend upon the composition of the ferrite desired. As is known to those skilled in the art, iron in the body-centered cubic form commonly occurs in steels, cast iron, and pig at about 910 degrees centigrade. Alpha and beta iron are the common varieties of ferrite, but the term "ferrite" is also applied to delta iron.

The ferrimagnetic oxides which are commonly referred to as ferrites usually comprise a compound, a multiple oxide, of ferric oxide with another oxide, as sodium ferrite ($NaFeO_2$), but more commonly a multiple oxide crystal.

Referring again to FIG. 1, one may optionally charge liquid and/or binder via line 22 to mixer 10. In one preferred embodiment, liquid is charged via line 22.

Substantially any liquid may be used which will not react with the solid ingredients in mixer 10 and, after sintering, not leave any harmful residues. Thus, by way of illustration, one may use an organic solvent such benzene, acetone, ketones, alcohols containing from about 1 to about 6 carbon atoms, aliphatic hydrocarbons, aromatic hydrocarbons, and the like.

It is preferred, however, that the liquid used be water, and that from about 10 to about 40 weight percent of water (by total weight of water and solid material) be used. In one preferred embodiment, from about 25 to about 35 weight percent of water is used.

Additionally, or alternatively, one may charge from about 0.1 to about 5 weight percent of binder (by total weight of material in mixer 10) via line 22. One may use any of the binders commonly used in ceramic processing. Thus, referring to James S. Reed's "Introduction to the Principles of Ceramic Processing" (John Wiley & Sons, New York, 1988), one may use one or more of the binders described on pages 152 et seq. of this book. Thus, e.g., one may use polyvinyl alcohol, polyethylene glycol, polymethyl metharcrylate, gum arabic, methyl cellulose, hydroxyethyl cellulose, lignosulfonates, and the like. Other suitable binders will be readily apparent to those skilled in the art.

One may also charge to mixer 10 from about 0.1 to about 1 weight percent of an antifoaming agent (see page 179 of the Reed book) such as, e.g., tall oil, sodium alkyl sufate, propylene glycol ether, 2-octadecanoic acid, and the like). Additionally, or alternatively, one may also add to mixer 10 from about 0.1 to about 1.0 weight percent of a deflocculant (see pages 132 et seq. of the Reed book) such as, e.g., sodium polyacrylate, sodium pyrophosphate, sodium silicate, sodium borate, etc. A discussion of the identity and function of many common deffloculants is presented in U.S. Pat. No. 4,282,006, the entire disclosure of which is hereby incorporated by reference into this specification.

The mixture in mixer 10 is then mixed until a substantially homogeneous mixture is produced. Referring to FIG. 1, samples from mixer 10 may be periodically removed via line 24 to laboratory 26, wherein the degree of homogeneity of the mixture may be evaluated by X-ray diffractometry analysis. X-ray diffractometer devices are well known to those skilled in the art and are described, e.g., in U.S. Pat. Nos. 5,359,640, 5,283,095, 5,107,530, 5,084,910, 5,008,909, and the like. The disclosure of each of these United States patents is hereby incorporated by reference into this specification.

When the mixture in mixer 10 has the desired degree of homogeneity, it then may be passed either to dryer 28 (via line 30), or calciner 32 (via line 34).

When the mixture in mixer 10 contains more than about 30 weight percent of liquid, it is preferred to dry it in dryer 28 until it contains less than about 20 weight percent of liquid and, preferably, less than about 1 weight percent of liquid. Thereafter, the dried material may be passed via line 36 to calciner 32.

It is preferred that, when the material is within dryer 28, it is subjected to a temperature of from about 50 to about 200 degrees centigrade and, more preferably, from about 100 to about 140 degrees centigrade.

In one preferred embodiment, dryer 28 is a spray dryer. Thus, e.g., one may use a spray drier or a fluidized bed dryer manufactured by Niro Inc. of 9165 Rumsey Road, Columbia, Md.

Samples from dryer 28 may be periodically removed to laboratory 26 via line 78 wherein analysis may be conducted to determine moisture content, angle of repose (which is a function of the granule size of spray-dried particles and, also, of moisture content), and particle size. It desired that, when the material from dryer 28 is to passed directly to former 42, the dry material have a moisture content of from about 0.05 to about 5.0 percent (and, more preferably, from about 0.2 to about 1.0 weight percent), an angle of repose of less than about 32 degrees, and a particle size distribution such that at least about 80 weight percent of its particles are smaller than about 80 microns and substantially all of its particles are smaller than about 600 microns. However, when the material from dryer 28 is to be passed via line 36 to calciner 32, then material should have a moisture content of less than about 30 weight percent.

Means of measuring the angle of repose of particulate materials are well known to those skilled in the art and are described, e.g., in U.S. Pat. Nos. 5,341,963, 5,324,097, 5,305,912, 5,305,535, 5,175,934, 5,130,106, 5,129,164, and the like. The disclosure of each of these United States patents is hereby incorporated by reference into this specification.

Means of measuring particle size distribution are well known and are described, e.g., in the aforementioned U.S. Pat. No. 4,282,006.

When the dried particles in drier 28 have the desired moisture content, angle of repose, and particle size distribution, they may be passed via line 40 to former 42. Alternatively, or additionally, material from mixer 10 may be passed via line 44 to former 42 when the material from said mixer contains less than about 20 weight percent of moisture.

Referring again to FIG. 1, and in one of the preferred embodiments described therein, it is preferred that, when the material in dryer 28 has the desired particle size distribution, moisture content, and angle of repose, it be passed via line 36 to calciner 32.

When the material is in calciner 32, it is preferably subjected to a temperature of from about 500 to about 1,600 degrees centigrade and, more preferably, from about 800 to about 1,150 degrees centigrade until a specified amount of such material has been converted to the spinel crystal phase. Samples of the material from calciner 32 may be periodically removed via line 42 to laboratory 26 and analyzed therein to determine the extent to which such material has been converted to the spinel crystal phase.

As used in this specification, the term "spinel crystal phase" refers to the crystal lattice structure characteristic of spinel materials; see, e.g., the crystal structure illustrated on page 138 of J Smit et al.'s "Ferrites" (John Wiley & Sons, New York, 1959). As is known to those skilled in the art, one may determine whether the spinel crystal phase structure exists in a material, and to what it exists, by standard X-ray diffraction techniques. Thus, e.g., one may use the procedures described in, e.g., U.S. Pat. Nos. 5,354,637 and 5,217,37, the entire disclosures of which are hereby incorporated by reference into this specification.

Referring again to FIG. 1, it is preferred to calcine the material in calciner 32 at a temperature of from about 500 to about 1,400 degrees centigrade and, more preferably, 900 to about 1,000 degrees centigrade until from about 20 to about 80 weight percent of the material in calciner 32 (and, more preferably, from about 30 to about 70 weight percent of the material in calciner 32) has the characteristic spinel crystal structure. It is even more preferred to conduct such calcining operation until from about 40 to about 60 weight percent of the material in calciner 32 has the characteristic spinel crystal structure.

After the material in calciner 32 has the desired structure, it is preferably passed via line 46 to grinder 48. Samples from grinder 48 may be periodically removed via line 38 to determine particle size distribution and the stoichiometry of the reagents in grinder 48. If, for example, there is an insufficient amount of iron oxide in the material in the material in grinder 48, it may be added via line 50. Alternatively, or additionally, one may add additional zinc oxide, manganese oxide, nickel oxide, and/or any other material which was deficient. Furthermore, one may add other reagents such as sources of silicon and calcium, lubricant(s), binder, deflocculant, plasticizer, and/or a preground ferrite material with a specified particle size distribution necessary to adjust the particle size distribution of the mixture.

Thus, e.g., instead of adding the deflocculant and/or the binder to mixer 10 (as discussed hereinabove), one may add it at this stage. Thus, e.g., one may add water (if wet grinding is desired) to a concentration specified before or, alternatively, may dry grind.

Referring again to FIG. 1, after the material in grinder 48 has some but not necessarily all of the desired properties, it may be passed via line 52 to holding tank 54, where a sufficient amount of such material may be accumulated. In one average, the material in tank 54 may be continuously mixed, and its properties may be modified by the addition of further lots from grinder 48 and/or of reagents to tank 54.

Referring again to FIG. 1, and in the preferred embodiment illustrated, the material from grinder 54 may be passed via line 56 to drier 58. Alternatively, or additionally, material from tank 54 may be passed to drier 58 by a line (not shown). Alternatively, material from grinder 48 may be passed directly via line 49 to former 42.

The material in drier 58 may be subjected to substantially the same conditions as the material in drier 28 prior to the time the former material is passed via line 60 to former 42.

Regardless of which path used by the material to reach former 42, it is preferred that the material to be formed have certain properties. In the first place, such material preferably contains from about 0.1 to about 5.0 weight percent of binder, but it need not contain any binder. In one embodiment, the binder used is a partially hydrolyzed polyvinyl alcohol sold by the Air Products and Chemicals Inc. of 7201 Hamilton Blvd., Allentown, Pa. as AIRVOL-205.

In the second place, it is preferred that the material to be formed have a particle size distribution such that all its particles are smaller than about 1,000 microns and, more preferably, smaller than about 600 microns. In an even more preferred, substantially all of the particles of the material to be formed are smaller than about 400 microns.

The material may be formed by any of the conventional shape forming ceramic processes. Thus, e.g., referring to the aforementioned Reed book, one may use die pressing (see pages 329 et seq.), hot or cold isotstatic compaction (see pages 349 et seq.), roll pressing (see page 351), extrusion (see pages 360–368), injection molding (see pages 373 et seq.), slip casting in a permeable mold (see pages 381 et seq.), tape casting (see pages 395 et seq.), forging, and the like.

In one preferred embodiment, tool and die dry pressing is used as the forming technique. This technique is described, e.g., in U.S. Pat. Nos. 3,717,693, 3,671,618, 3,523,344, and the like. The entire disclosure of each of these patents is hereby incorporated by reference into this specification.

It is preferred that the green body formed in the forming operation have a density of from about 2 to about 7 grams per cubic centimeter. In one embodiment, the density of the green is from about 2.5 to about 3.5 grams per cubic centimeter.

It is also preferred that the green body have mechanical integrity and be substantially free of physical defects such as cracks, pores, laminations, and the like.

The green body formed in former 42 may be processed in one of several different methods. It may be passed via line 62 to rounding/etching operation 64 (see FIG. 2). It may be passed via line 66 to oxygen treatment operation 68. It may be passed via line 70 to surface alteration operation 72.

Figure 2:
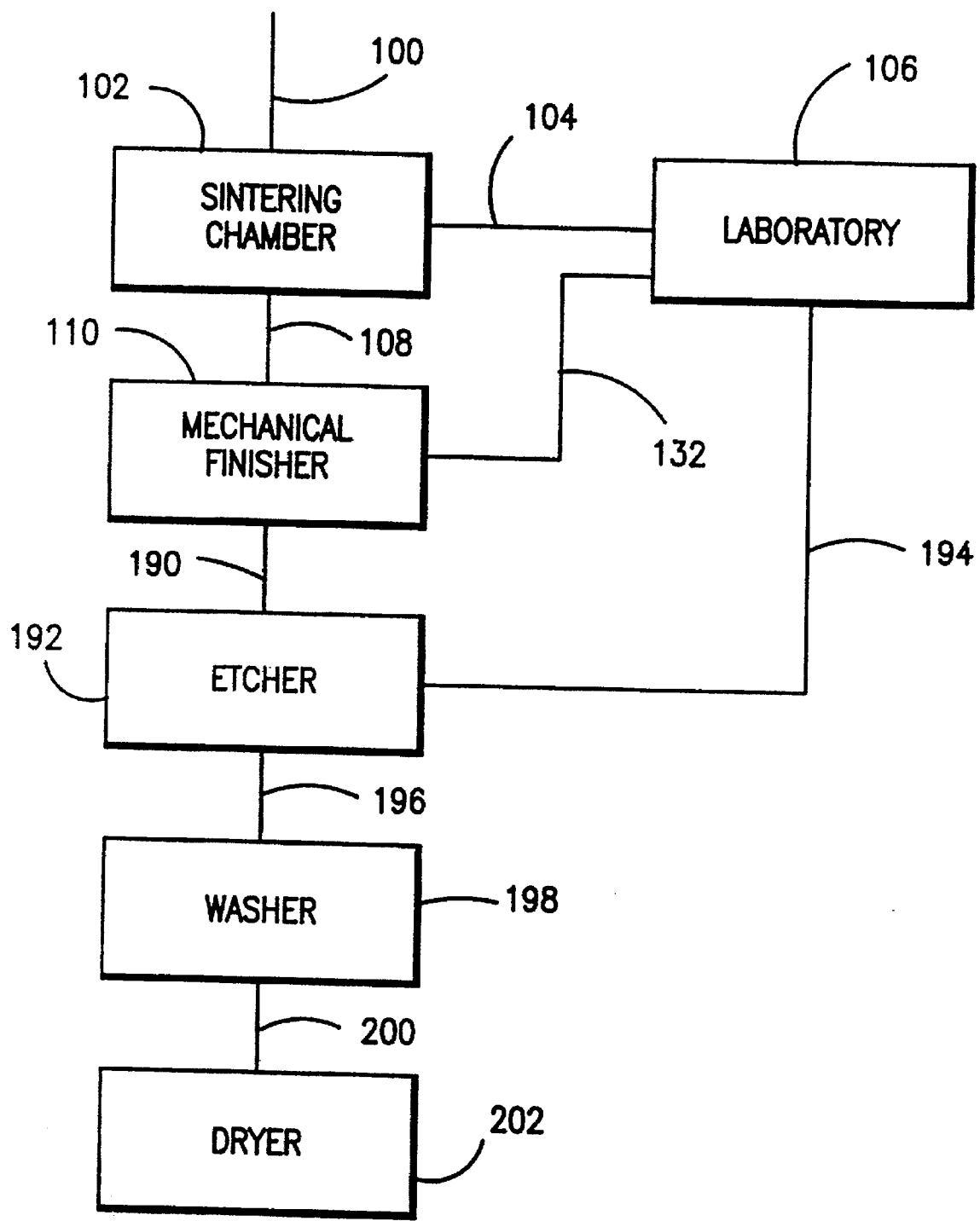
FIG. 2 is a partial flow diagram illustrating a rounding/etching process.

Referring to FIG. 2, the formed green body (not shown) from the former 42 (not shown in FIG. 2, but see FIG. 1) may be fed via line 100 to sintering chamber 102.

As will be apparent to those skilled in the art, one may sinter with microwave energy and/or heat and/or induction heat.

In one preferred embodiment, heat is used to sinter the green body. In this embodiment, the temperature of the green body is raised from ambient to about 100 degrees centigrade.

When the green body is comprised of organic binder, it is preferred to raise its temperature from about 100 to about 275 degrees centigrade at a rate of from about 1 to about 30 degrees per hour. However, when the green body does not contain organic binder, the rate of temperature increase may be as high as about 400 degrees per hour. The atmosphere used during this portion of the cycle is preferably oxygen-containing gas (such as, oxygen, mixtures thereof, and the like).

Thereafter, the temperature of the green body is raised from about 275 degrees centigrade to a temperature between about 1,100 to about 1,500 degrees centigrade at a rate of from about 1 to about 500 degrees per hour and, more preferably, at a rate of from about 100 to about 300 degrees per hour. It is preferred to use an oxygen-containing atmosphere during this portion of the cyle.

In one embodiment, when the temperature of the green body is about 1,250 degrees centigrade, it is then slowly raised to a temperature of from about 1,300 to about 1,350 degrees centigrade at rate less than about 25 degrees per hour; although the green body may be maintained at this temperature for from about 4 to about 8 hours, but it need not be so soaked.

In this embodiment, when the green body is not so soaked, thereafter, the temperature of the green body is raised to a sintering temperature of from about 1100°–1500° C., and preferably about 1,350 to about 1,500 degrees centigrade and maintained at this temperature until the desired density, microstructural, electrical properties, and magnetic properties are obtained and, preferably, until the green body has a density of at least about 50 percent of its theoretical density (and, more preferably, at least about 90 percent of its theoretical density). Samples may be periodically withdrawn from chamber 102 via line 104 and evaluated in laboratory 106.

After the green body has been sintered and obtained the desired density, it is then preferably subjected to a specified cooling cycle. The sintered body is cooled from the peak sintering temperature to ambient at rate of from 1 to about 500 degrees per hour. During this cooling cycle, the sintered body is contacted with an atmosphere whose composition changes.

In one embodiment, when the sintered body is between a temperature of from about 1,000 degrees centigrade and 700 degrees centigrade, the sintered body is subjected to an atmosphere containing no more than about 10 volume percent and, more preferably, less than about 1 volume percent of oxygen.

From about 700 degrees centigrade to about 200 degrees centigrade, the sintered body, while cooling, is subjected to an atmosphere containing less than about 1,000 parts per million of oxygen and, more preferably, less than about 100 parts per million of oxygen.

The cooled and sintered body is then passed via line 104 to laboratory 106, wherein the magnetic properties of the of the body may be tested. Thus, e.g., one may test the permeability, the hysteresis magnetization, the loss factor, the volume resistivity, the amplitude permeability, the phase identification, the porosity, the morphology, and the like. These and other parameters, and means for evaluating them, are described in B. D. Cullity's "Introduction to Magnetic Materials" (Addison-Wesley Publishing Company, Reading, Mass., 1972). Reference also may be had to Richard M. Bozorth's "Ferromagnetism" (IEEE Press, Piscataway, N.J., 1993); page 822 of this reference discloses, e.g., means for evaluating the permeability of a ferrite sample.

The cooled and sintered body from sintering chamber 102 is then passed via line 108 to a mechanical finishing device 110 in which sharp edges of the body is removed by vibration and mechanical contact with other similar bodies.

Figure 2A:
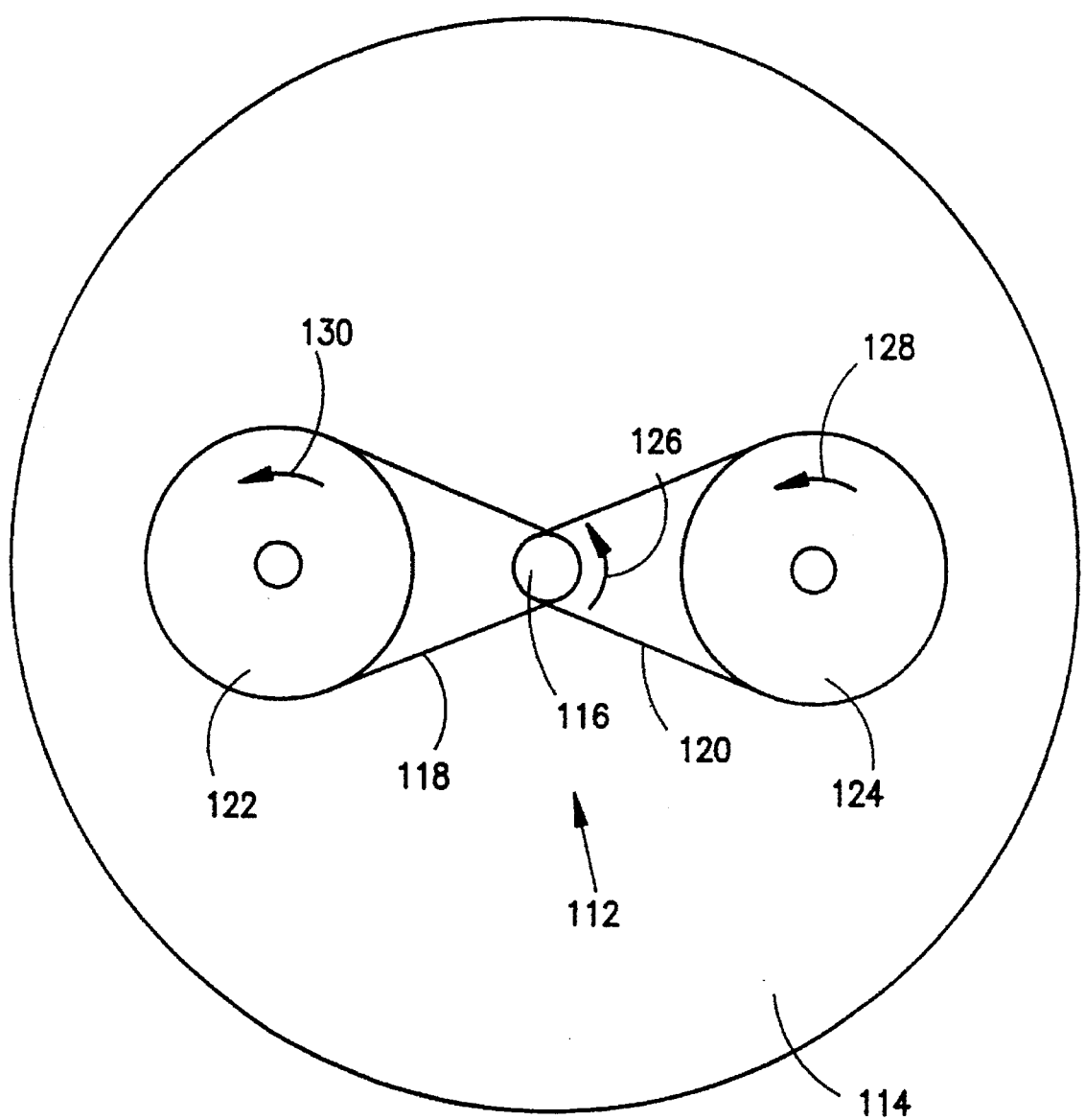
FIG. 2A is a top view of one preferred edge-rounding mechanism.

One means for effecting such mechanical finishing is illustrated in FIG. 2A. Referring to FIG. 2A, it will be seen that edge rounding device 112 is preferably mounted on a table 114 and is comprised of a shaft 116 connected by belt 118 and 120 to rotating cylindrical vessels 122 and 124; shaft 116 rotates in the direction of arrow 126, thereby causing tub 124 to rotate in the direction of arrow 128, and tub 122 to rotate in the direction of arrow 130.

The ferrites bodies (not shown) are disposed within either or both of tubs 122 and 124. Additionally, tubs 122 and 124 may also contain water and or organic or inorganic solvent, grinding media, and the like. In one embodiment, ferrite parts with a geometry different than that of the parts being treated are used as the grinding media.

In one embodiment, shaft 116 rotates at a rate of from about 10 to about 100 revolutions per minute. In an even more preferred embodiment, the rotation rate is from about 60 to about 120 r.p.m.

Samples may be periodically removed from mechanical finisher 110 (see FIG. 2) via line 132 to laboratory 106 in order to evaluate the extent to which the edges of the ferrite bodies have been rounded and the extent to which the permeability of the ferrite has been changed.

Figure 4A:
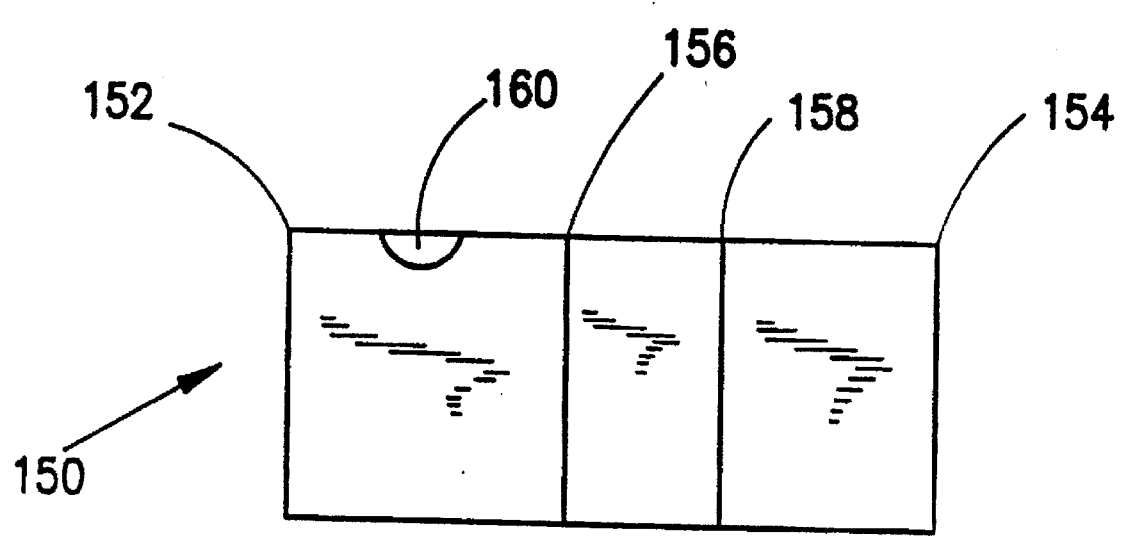
FIG. 4A is a sectional view of a prior art ferrite body.

It will be apparent to those skilled in the art that the ability to edge round the ferrite bodies in the instant process is a substantial advantage. Referring to FIG. 4A, which depicts a ferrite body 150 made by a prior art process, it will be seen that such ferrite body 150 has sharp edges 152 and 154, 156, and 158, and a chip 160. The sharp edges pose a danger to wire (not shown) customarily wound around the ferrite body to make a magnetic device comprising the body. The chip 160 produces an area with undesirable magnetic properties.

Figure 4B:
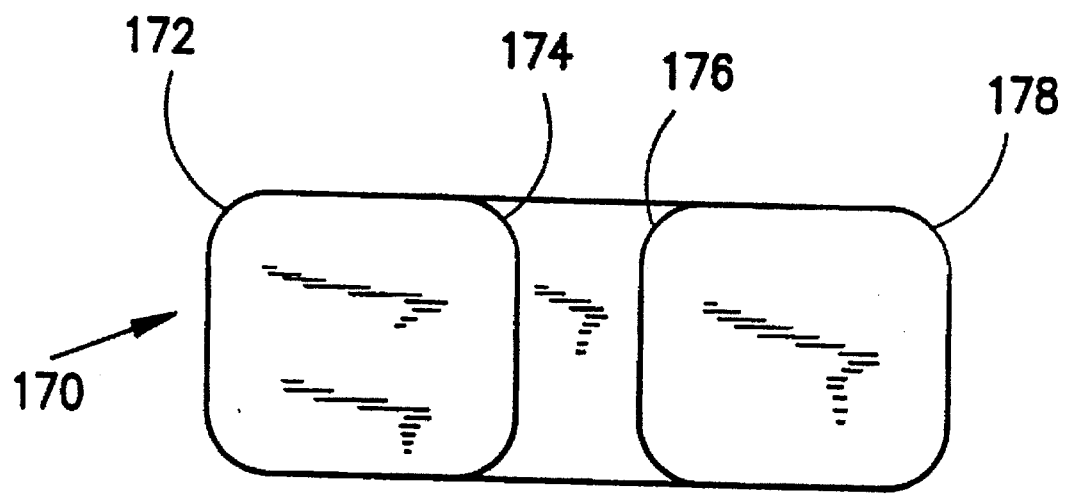
FIG. 4B is a sectional view of a ferrite body made by a preferred process of the instant invention.

By comparison, FIG. 4B produces a body 170 with rounded edges 172, 174, 176, and 178 and no dents or chips.

Referring again to FIG. 2, the mechanical finishing process is preferably conducted until the permeability of the ferrite body is changed (plus or minus) from 1 to about 80 percent and, more preferably, from about 5 to about 60 percent.

As will be apparent to those skilled in the art, other means of may be used to change the permeability of the ferrite body and remove sharp edges. Thus, by way of illustration and not limitation, one may shot peening, jet milling, ultrasonic vibration, sanding, machining, and the like. Any method which changes both the appearance and the permeability of the ferrite body may be used.

The treated body from mechanical finisher 110 may then be (but need not be) passed via line 190 to etcher 192, wherein it is contacted with an etchant.

One may use any of the etchants know to be effective with ferrites. Thus, e.g., one may use hydrochloric acid, phosphoric acid, nitric acid, sulfuric acid, aqua regia, hydrofluoric acid, alkali metal hydroxides, and the like. See, e.g., U.S. Pat. Nos. 4,169,026, 4,875,970, 4,214,960, 4,781,852, 5,228,185, 5,250,150, 5,356,514, and the like. The disclosure of each of these United States patents is hereby incorporated by reference into this specification.

Samples from ether 192 may be periodically evaluated in laboratory 106 by passing them to such laboratory via line 194. In one embodiment, laboratory 106 is an on line with the samples in etcher 192 and continually monitors their properties.

The object of the etching operation is to move the permeability of the sample in the direction opposite to which it was moved in the mechanical finishing operation. In general, it is preferred to regain from about 2 to about 95 percent of change in permeability produced by the mechanical finishing step.

By way of illustration, one ferrite body has an initial permeability of 11,000. After mechanical finishing, its permeability was 5,500. After etching, its permeability rose to 10,700.

By way of further illustration, another ferrite body has an initial permeability of 9,000 which rose to 12,000 after mechanical finishing and decreased to 10,000 after etching.

The production of a surface modification of the ferrite body followed by a partial controlled undoing of such surface modification allows one to adjust the desired permeability property and cross it both ways, in order to optimize these properties. It will be apparent that, if the mechanical finisher produces the exact desired property or properties, there may be no need for the subsequent etching. However, as will also be apparent to those skilled in the art, because several properties need to be optimized, it is often advantageous to use both processes.

One substantial advantage of the process, however, is that there is no need to worry about applying too much edge rounding treatment inasmuch as the effect of this treatment upon the properties can be at least in part counteracted by the etching.

In one preferred embodiment, the enchant used is hydrochloric acid solution which, preferably, has a concentration of from about 10 to about 100 percent. In this embodiment, the bath is at a temperature of from about ambient to about 100 degrees centigrade. In general, in this embodiment, the part is contacted with the hydrochloric acid for from about 10 seconds to about 50 hours and, more preferably, form about 5 to about 50 minutes.

The etched ferrite is then passed via line 196 to washer 198, wherein the enchant is washed (preferably with water) to remove it from the surface of the ferrite. Thereafter, the washed ferrite is passed via line 200 to dryer 202. In one embodiment, the ferrite body is air dried under ambient conditions while being contacted with flowing air.

Referring again to FIG. 1, instead of passing the green body via line 62 to rounding/etching step 64, one may pass the green via line 66 to oxygen treatment step 68.

Oxygen step 68 is similar to rounding etching step 64 but differs from it that (1) it does not provide edge rounding, (2) during a portion of the cooling cycle, between from about 500 to about 200 degrees centigrade, the sample is contacted with oxygen containing gas (oxygen and/or air) during the cooling. In this process, the body is subjected to the steps sintering 102 (see FIG. 2), but with the modification described above.

Alternatively, one may subject the formed body to the surface alternation process 72 described in FIG. 1. In this process, the green body is calcined rather than sintered, and, thereafter, is edge-rounded and subsequently sintered. The process may be further enhanced by additional edge rounding and/or sintering steps, with or without the presence of oxygen-containing gas.

Figure 3:
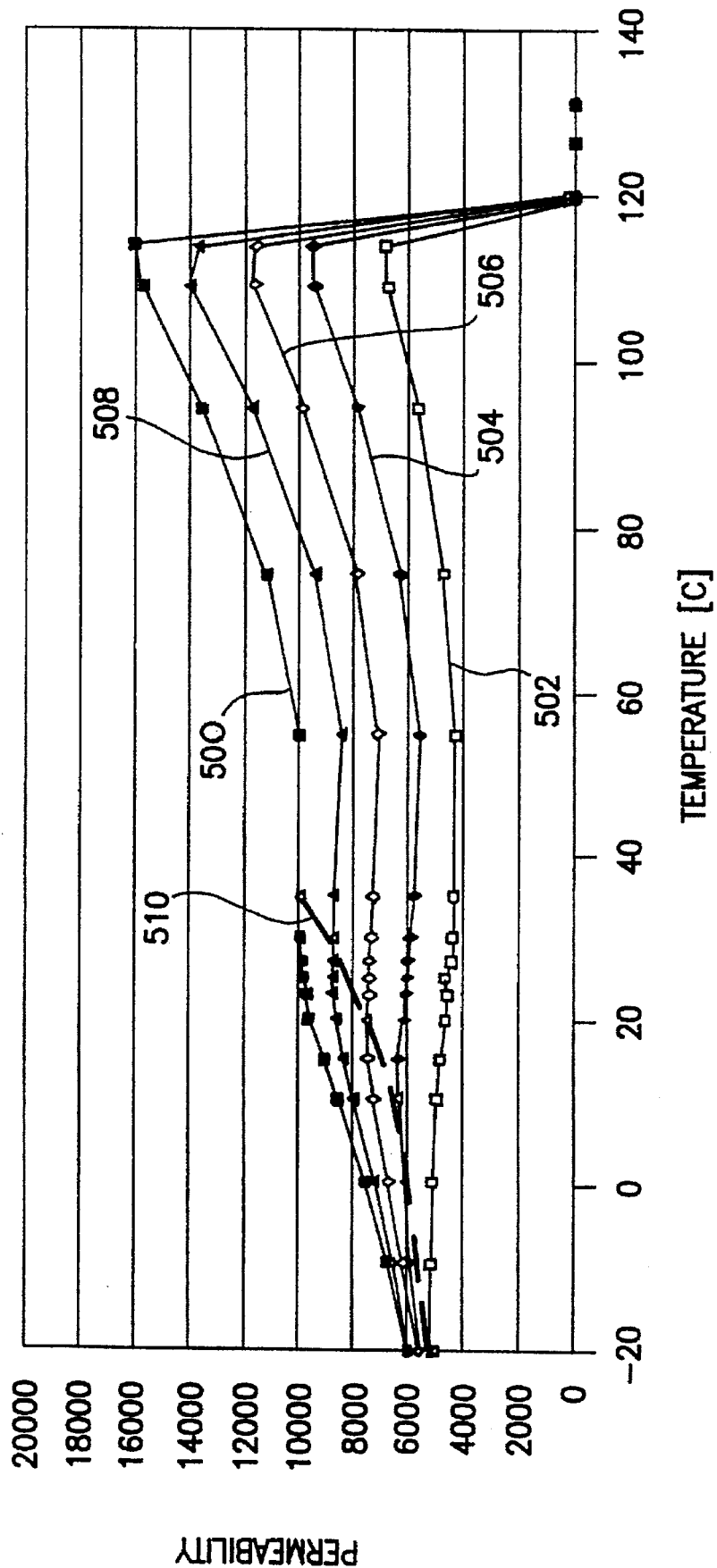
FIG. 3 is a graph of permeability versus temperature for sintered ferrite bodies made by various processes.

FIG. 3 is a graph of processed ferrite bodies produced by various processes. In each process, however, the ferrite used was a maganese/zinc ferrite with an initial permeability of 10,000 which had been formed and sintered in substantial accordance with the procedure of FIG. 2. The graphs display the permeability of the body at various temperatures and under various conditions.

Referring to FIG. 3, graph 500 shows the permeability of the body produced after sintering step 102 (see FIG. 2). By comparison, graph 502 shows the peremeability of the same body after mechanical finishing step 110 had occurred for ten minutes (see FIG. 2). However, after the body was etched (see step 102) at either 1 minute (see curve 504), or three minutes (see curve 506), or five minutes (see curve 508), the peremeability of the body was partially recovered. Curve 510 illustrates how the local maximum at a temperature of −20 to 40 degrees centigrade shifted as the processing conditions changed.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A process for preparing a ferrite, comprising the steps of:
    (a) forming a wetted ferrite precursor composition including at least about 50 weight percent of at least one iron compound, wherein substantially all of the particles in such precursor composition are smaller than about 1,000 microns;
    (b) drying any portion of the precursor composition having more than approximately 30 percent liquid to form a powder having a moisture content between approximately 0.2 to 1.0 weight percent and an angle of repose of approximately 32 degrees;
    (c) calcining the powder until approximately 30 to 60 weight percent of the material has a spinel crystal structure;
    (d) forming the powder into a body configuration;
    (e) contacting the formed body with a temperature of from about 1,350 to about 1,500 degrees centigrade;
    (f) cooling the body from a temperature greater than 1,000 degrees centigrade to a temperature of approximately 700 degrees centigrade while contacting the body with an atmosphere containing less than about 10 volume percent of oxygen;
    (g) further cooling the body from the approximate temperature of 700 degrees to a temperature of 200 degrees while contacting the body with an atmosphere containing less than 100 parts per million of oxygen, thereby producing a sintered body with an initial permeability;
    (h) changing the initial permeability of the sintered body while simultaneously removing sharp edges present on the sintered body, thereby producing an edge-rounded sintered body; and
    (i) contacting the edge-rounded sintered body with an etchant.

2. The process as recited in claim 1, wherein the iron compound is ferric oxide.

3. The process as recited in claim 2, wherein the iron compound is alpha ferric oxide.

4. The process as recited in claim 3, wherein the alpha ferric oxide has a particle size distribution such that substantially all of its particles are smaller than about 10 microns.

5. The process as recited in claim 4, wherein the precursor composition is comprised of at least about 65 weight percent of the alpha ferric oxide.

6. The process as recited in claim 5, wherein the precursor composition is comprised of from about 10 to about 20 weight percent of at least one zinc compound.

7. The process as recited in claim 6, wherein the zinc compound is zinc oxide.

8. The process as recited in claim 7, wherein the precursor composition contains from about 10 to about 20 weight percent of an oxide of manganese.

9. The process as recited in claim 8, wherein the precursor composition is comprised of from about 0.1 to about 5 weight percent of organic binder.

10. The process as recited in claim 9, wherein the calcined powder has a density of from about 2 to about 7 grams per cubic centimeter.

11. The process as recited in claim 10, wherein the calcined powder has a density of from about 2.5 to about 5.5 grams per cubic centimeter.

12. The process as recited in claim 1, wherein the precursor composition is raised from a temperature of 100 degrees centigrade to a temperature of 275 degrees centigrade at a rate of from about 1 to about 30 degrees per hour.

13. The process as recited in claim 1, wherein the sintered body is subjected to edge rounding until its permeability has changed from about 5 to about 60 percent.

\* \* \* \* \*